(12) United States Patent
Weykamp et al.

(10) Patent No.: US 6,886,873 B2
(45) Date of Patent: May 3, 2005

(54) BUMPER BEAM WITH CRUSH INITIATING APERTURES

(75) Inventors: Robert Weykamp, Grand Haven, MI (US); Michael J. Hall, Pentwater, MI (US); David Powell, Grand Haven, MI (US)

(73) Assignee: Shape Corporation, Grand Haven, MI (US)

( * ) Notice: Subject to any disclaimer, the term of this patent is extended or adjusted under 35 U.S.C. 154(b) by 0 days.

(21) Appl. No.: 10/768,596

(22) Filed: Jul. 2, 2004

(65) Prior Publication Data

US 2004/0217606 A1 Nov. 4, 2004

Related U.S. Application Data

(62) Division of application No. 10/285,009, filed on Oct. 31, 2002, now Pat. No. 6,695,368.

(51) Int. Cl.[7] .............................................. B60R 19/34
(52) U.S. Cl. ........................ 293/133; 293/154; 293/150
(58) Field of Search ................................. 293/133, 142, 293/149, 150, 154; 296/187.03, 187.1, 187.09; 267/139, 140

(56) References Cited

U.S. PATENT DOCUMENTS

| | | |
|---|---|---|
| 1,321,655 A | 11/1919 | McKee |
| 1,346,668 A | 7/1920 | Newton |
| 1,484,157 A | 2/1924 | Plank |
| 1,585,782 A | 5/1926 | Mascuch |
| 1,632,563 A | 4/1927 | Sager |
| 1,665,320 A | 4/1928 | Nutt |
| 1,748,096 A | 2/1930 | Yanss |
| 1,885,435 A | 11/1932 | Hammond |
| 2,030,978 A | 2/1936 | Fortier et al. |
| 2,147,745 A | 2/1939 | MacKinnon |

(Continued)

FOREIGN PATENT DOCUMENTS

EP 0041413 A1 4/1981

Primary Examiner—Patricia L. Engle
(74) Attorney, Agent, or Firm—Price Heneveld Cooper DeWitt & Litton (57) ABSTRACT

A bumper system for vehicles includes a tubular beam having front, top, bottom, and rear walls, and further having open tubular ends. The bumper system further includes a pair of mounting brackets each attached to the rear wall and extending around the associated ends and forwardly to a location where it attaches to the front wall of the one end. One or more crush initiating apertures are formed in one or more of the walls of the ends of the beam to provide more controlled energy absorption upon corner impost so as to reduce or better control damage to the vehicle's frame.

21 Claims, 6 Drawing Sheets

U.S. PATENT DOCUMENTS

| | | | |
|---|---|---|---|
| 3,739,882 A | | 6/1973 | Schwenk et al. |
| 3,847,428 A | | 11/1974 | Uebelstadt |
| 4,010,969 A | | 3/1977 | Cantrell et al. |
| 4,022,505 A | * | 5/1977 | Saczawa, Jr. ............... 293/120 |
| 4,252,355 A | | 2/1981 | Goupy et al. |
| 4,328,986 A | | 5/1982 | Weller et al. |
| 4,413,856 A | | 11/1983 | McMahan et al. |
| 4,422,680 A | | 12/1983 | Goupy |
| 4,573,724 A | | 3/1986 | Campen |
| 4,626,001 A | | 12/1986 | Lee |
| 4,998,761 A | | 3/1991 | Bayer et al. |
| 5,080,412 A | * | 1/1992 | Stewart et al. ............... 293/155 |
| 5,290,078 A | | 3/1994 | Bayer et al. |
| 5,306,058 A | | 4/1994 | Sturrus et al. |
| 5,358,294 A | | 10/1994 | Palmer |
| 5,425,561 A | | 6/1995 | Morgan |
| 5,441,319 A | | 8/1995 | Oyama et al. |
| 5,462,144 A | | 10/1995 | Guardiola et al. |
| 5,498,045 A | * | 3/1996 | Morgan et al. .............. 293/122 |
| 5,803,517 A | | 9/1998 | Shibuya |
| 5,829,805 A | | 11/1998 | Watson |
| 5,876,078 A | | 3/1999 | Miskech et al. |
| 6,042,163 A | | 3/2000 | Reiffer |
| 6,082,792 A | | 7/2000 | Evans et al. |
| 6,155,633 A | | 12/2000 | Minami et al. |
| 6,179,353 B1 | | 1/2001 | Heatherington et al. |
| 6,254,161 B1 | | 7/2001 | Wochaski |
| 6,318,775 B1 | | 11/2001 | Heatherington et al. |
| 6,406,081 B1 | | 6/2002 | Mahfet et al. |
| 6,474,709 B2 | | 11/2002 | Artner |
| 6,672,635 B2 | * | 1/2004 | Weissenborn et al. ...... 293/120 |
| 6,695,368 B1 | | 2/2004 | Weykamp et al. |
| 6,712,411 B2 | * | 3/2004 | Gotanda et al. ............. 293/155 |
| 6,733,055 B2 | * | 5/2004 | Iino .......................... 293/142 |
| 2003/0189344 A1 | * | 10/2003 | Evans ........................ 293/120 |

* cited by examiner

BUMPER BEAM WITH CRUSH INITIATING APERTURES

CROSS REFERENCE TO RELATED APPLICATION

This application is a divisional application of application Ser. No. 10/285,009, filed Oct. 31, 2002, now U.S. Pat. No. 6,695,368, entitled BUMPER MOUNT FORMING CORNER ON END OF BEAM.

BACKGROUND

The present invention relates to vehicle bumper systems having a bumper beam and components attached to the beam for forming a structural corner of a vehicle.

Vehicle bumper systems commonly include beams and components attached to ends of the beams for forming aesthetically pleasing corners on vehicles, for supporting fascia, and for providing structure to withstand corner impacts. However, the additional components add cost, weight, and secondary operations, and further can add dimensional variations and quality control problems. Further, every additional piece adds hidden costs, such as increased inventory, parts management, floor space requirements, and the like.

It is desirable to integrate components in bumper systems to save space, to reduce the number of parts, and to reduce the complexity of assembly. However, this must be done without sacrificing cost, quality, and bumper strength, and without sacrificing the ability to tune the bumper system to pass federal motor vehicle safety standards (FMVSS) and regulations. In particular, it is desirable to provide a system having an optimized transfer of energy from corner impacts to the structure of the bumper beam and to the structure of the vehicle frame, in order to assure that the vehicles pass the increasingly difficult federal regulations relating to corner impact strengths and functional requirements.

Accordingly, a bumper system is desired solving the aforementioned problems and having the aforementioned advantages.

SUMMARY OF THE PRESENT INVENTION

In one aspect of the present invention, a bumper system for vehicles includes a tubular beam having front, top, bottom, and rear walls defining at least one tube. The bumper system further includes a pair of mounting brackets attached to the beam near associated ends of the beam, the mounting brackets each having an inboard edge and the tubular beam having an end section that begins at a location near the inboard edge and that extends to the associated end of the beam. At least one of the front, top, bottom, and rear walls have an enlarged aperture forming a crush initiator on the end section, the crush initiator being shaped to selectively reduce a strength of the beam in an area of the crush initiator for controlling corner impact strength.

In another aspect of the present invention, a method includes steps of providing a tubular beam having front, top, bottom, and rear walls defining at least one tube section. The method further includes attaching mounting brackets to the beam, with the beam including end sections that extend in an outboard direction from the mounting brackets. Also, the method includes forming crush initiating apertures in the end sections so as to weaken the ends sections for providing a desired corner impact energy absorption.

These and other aspects, objects, and features of the present invention will be understood and appreciated by those skilled in the art upon studying the following specification, claims, and appended drawings.

DETAILED DESCRIPTION OF PREFERRED EMBODIMENTS

A bumper system 20 (FIG. 1) adapted for attachment to a vehicle includes a beam 21, mounting brackets 27, and an energy absorber 32. More particularly, the bumper system 20 includes a tubular beam 21 having front, top, bottom, and rear walls 22–25, and further having opposing open tubular ends 26. The mounting brackets 27 are attached to each of the ends 26 of the bumper beam 21 and are further attached to the vehicle frame 39. The two mounting brackets 27 each have a U-shaped inboard mounting section 28 attached to the rear wall 25 of an associated open tubular end 26 and have an integral corner-forming section 29 extending outwardly from the mounting section 28 laterally around the associated end 26 and forwardly to a location where the corner-forming section 29 attaches to the front wall 22 of the one end 26. The section 29 can attach to a front surface or a rear surface of the front wall 22, although attachment to the front surface is preferred, such as by welding.

Figures 1, 2:
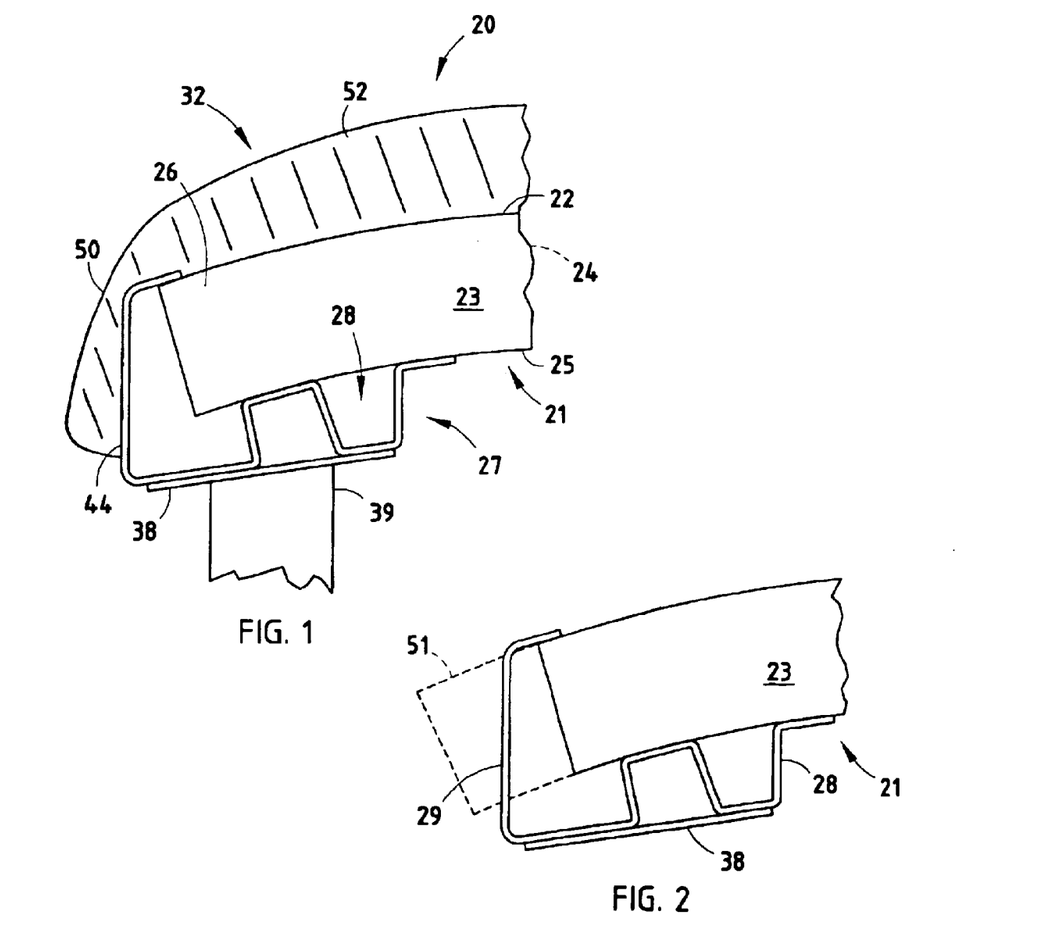
FIG. 1 is a top fragmentary view of a bumper system embodying the present invention.
FIG. 2 is a top fragmentary view of the bumper beam and mounting bracket of FIG. 1, with the energy absorber being removed to more clearly show the arrangement.

The corner-forming section 29 includes an intermediate portion 44 with unattached upper and lower edges, enabling the intermediate portion 44 to resiliently flex and deform and absorb energy upon corner impact. Further, the intermediate portion 44 is well adapted to transfer energy directly to a vehicle frame through remaining parts of the bracket 27 due to the bracket's integral connection to the mounting structure of the bumper system and vehicle. Thus, this arrangement provides efficient and effective energy absorption upon corner impact, since the energy absorber 32 is directly supported on a front surface of the beam 21 by the front wall 22 of the beam 21 and also directly supported by the corner-forming section 29 of the mounting bracket 27. Thus, the corner-forming section 29 forms an integrated and structurally solid support well suited for absorbing energy upon corner impact from a vehicle crash.

Figure 1A:
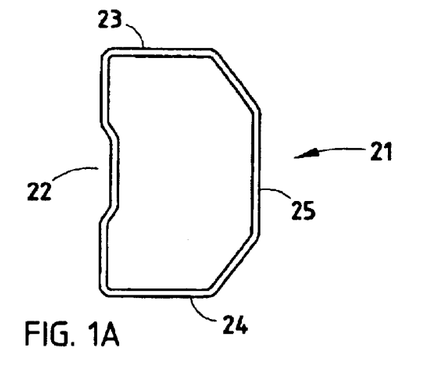
FIG. 1A is a transverse cross section of the tubular metal beam in FIG. 1.

The illustrated beam 21 (FIG. 1A) is tubular and D-shaped, such as is disclosed in U.S. Pat. No. 5,306,058. However, it is contemplated that the tubular bumper can be B-shaped as disclosed in U.S. Pat. No. 5,454,504. Alternatively, the beam may have other shapes. The illustrated beam 21 has a continuous transverse tubular cross-sectional shape. It is contemplated that the beam can be rollformed, extruded, molded, or otherwise formed.

Mounting brackets 27 (FIG. 1B) are generally W-shaped and include the U-shaped inboard mounting section 28 and further include the outboard corner-forming section 29. The illustrated outboard corner-forming portion 29 extends outwardly and around the open end 26 of the beam 21. The mounting section 28 has flanges 35 and 36 that are attached to the rear wall 25 by welding and further includes a rear attachment flange 37 that is welded to a plate 38. The plate 38 is attached to an end of a mounting stay or vehicle frame rail 39. It is noted that the plate 38 can be welded to the bracket 27 and bolted to the rail 39; or can be welded to the rail 39 and bolted to the bracket 27; or a plate 38 can be included on both for bolting together.

Figure 1B:
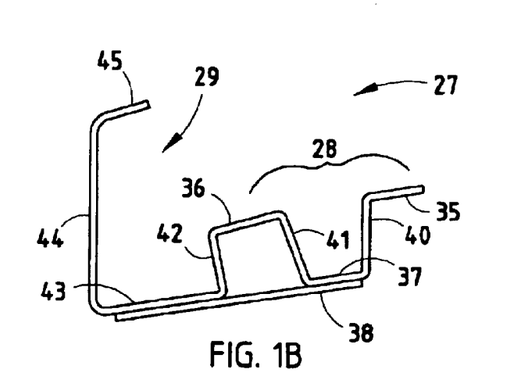
FIG. 1B is a top view of the mounting bracket of FIG. 1.
Figure 3:
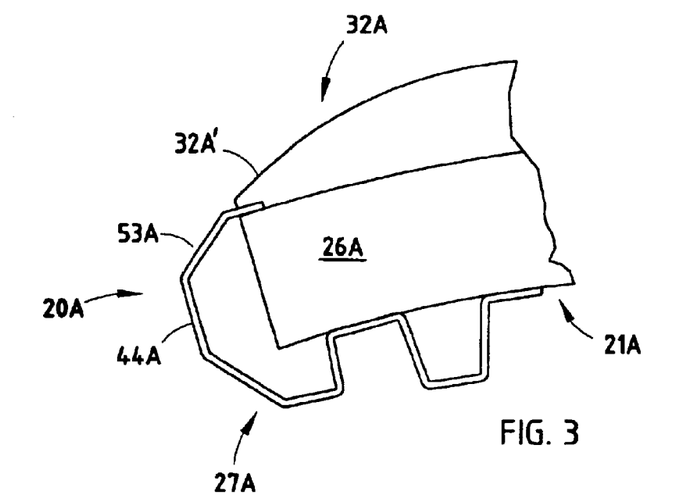
FIG. 3 is a top fragmentary view of a first modified bumper system.
Figures 4, 5:
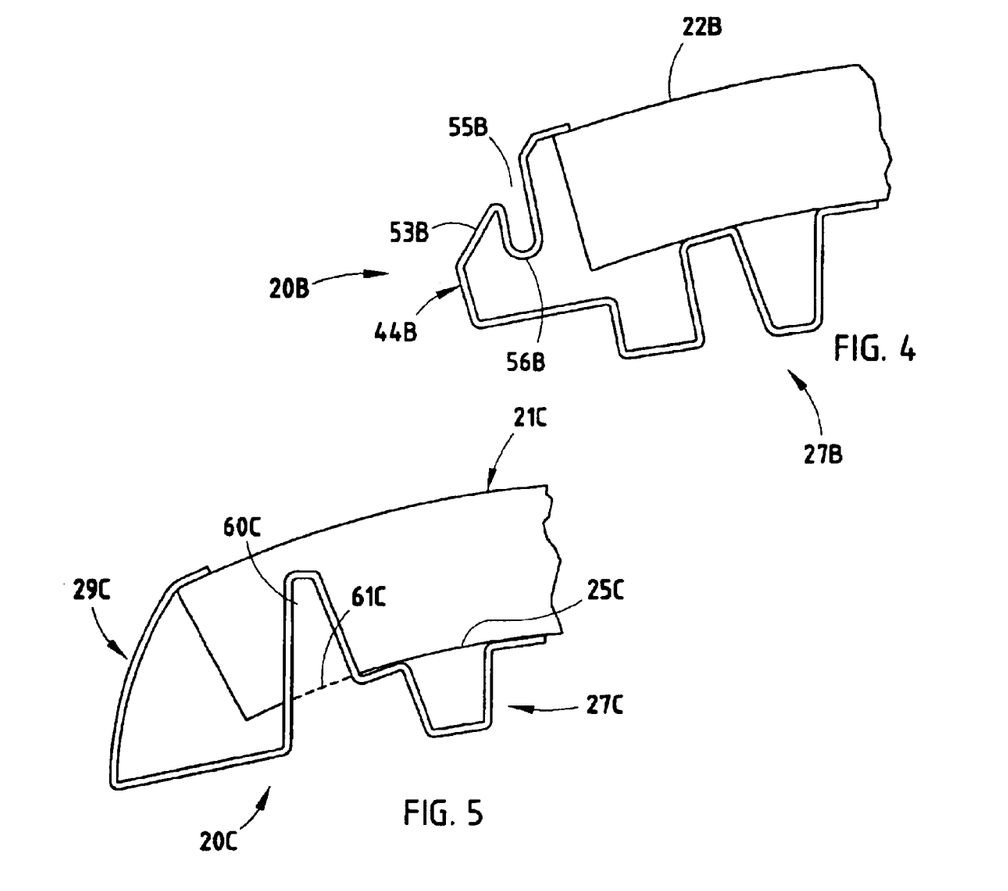
FIG. 4 is a top fragmentary view of a second modified bumper system.
FIG. 5 is a top fragmentary view of a third modified bumper system.
Figures 6, 7:
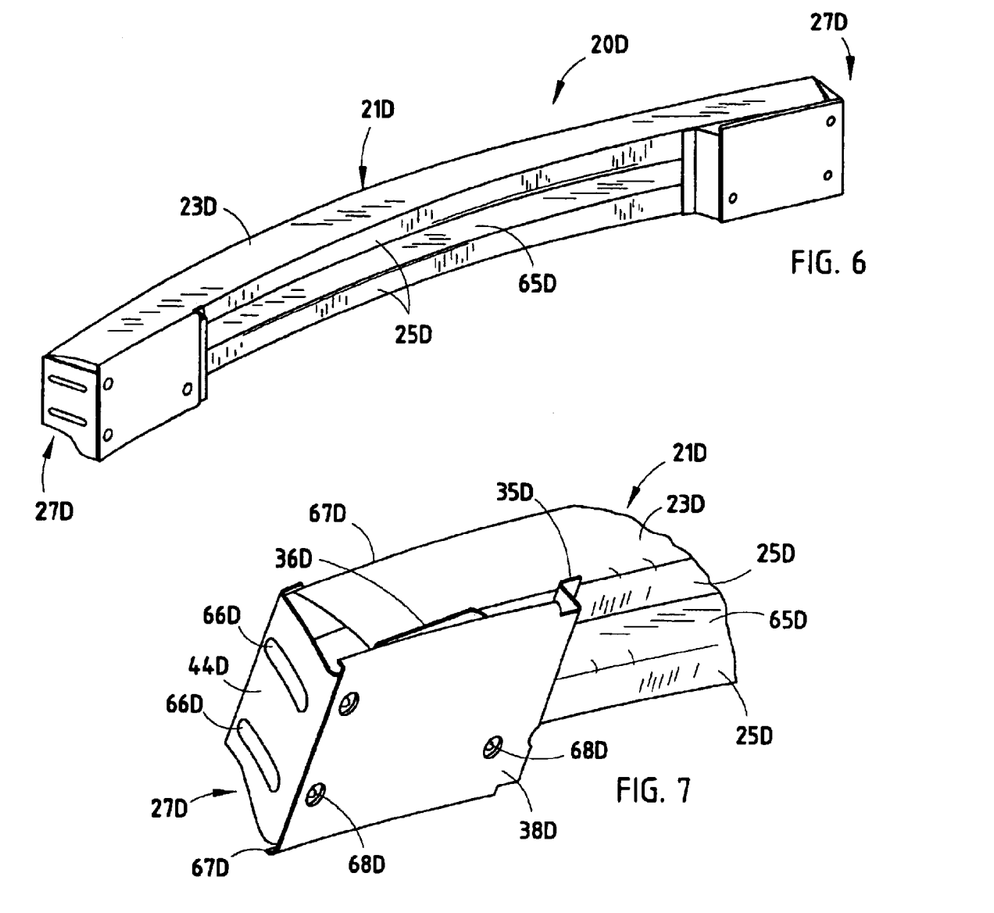
FIG. 6 is a top fragmentary perspective view of a fourth modified bumper system.
FIGS. 7–8 are enlarged top and bottom perspective views of an end of FIG. 6.
Figure 8:
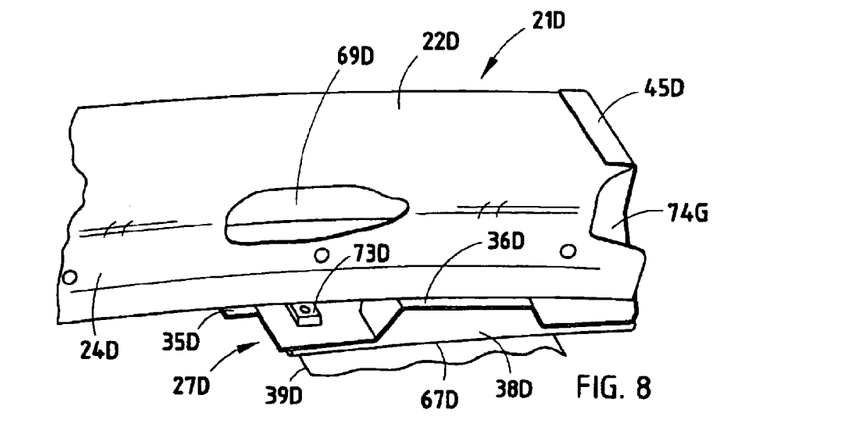
Figure 9:
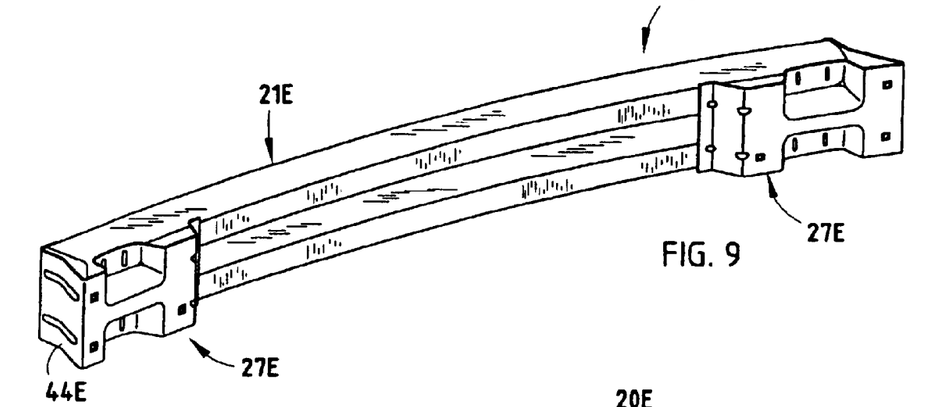
FIG. 9 is a top perspective view of a fifth modified bumper system.
Figure 10:
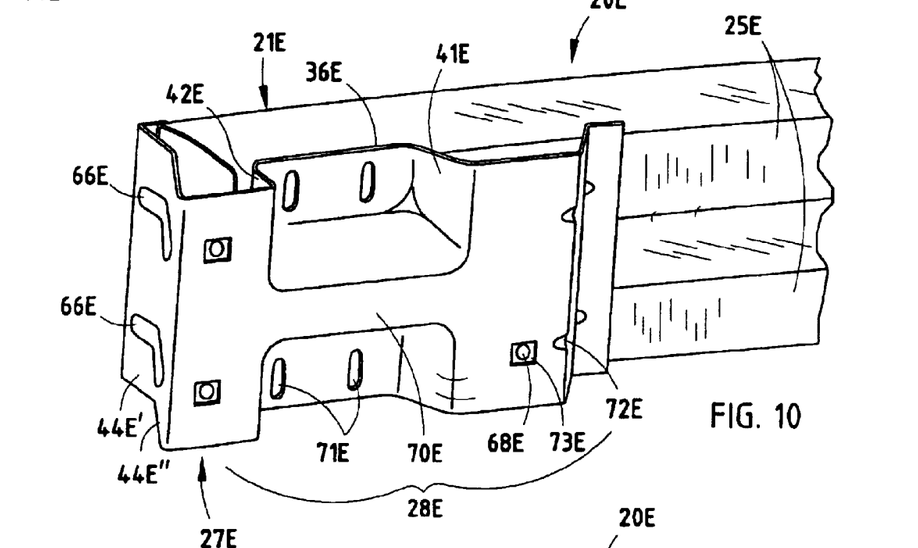
FIGS. 10–11 are enlarged rear perspective and top fragmentary views of an end of FIG. 9.
Figure 11:
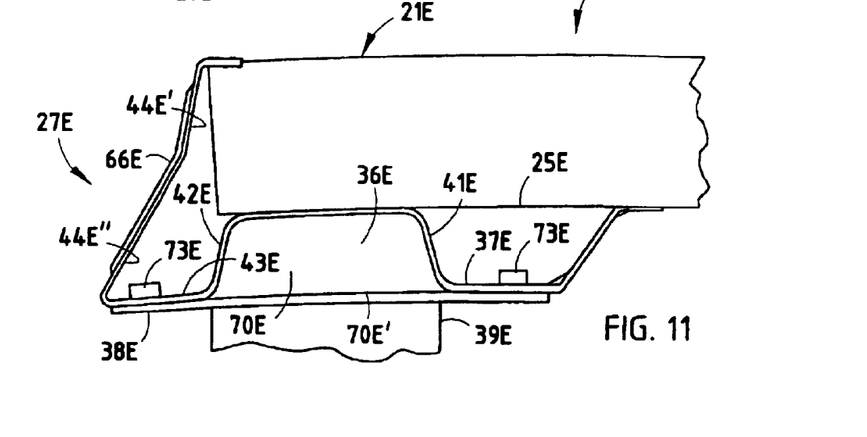
Figure 12:
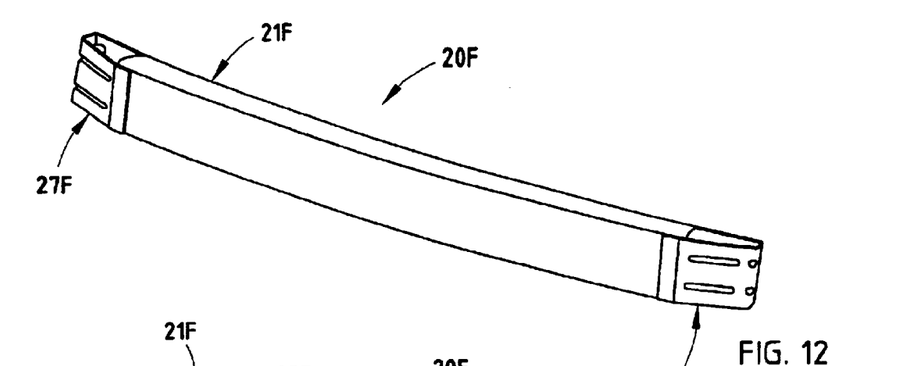
FIG. 12 is a top perspective view of a sixth modified bumper system.
Figure 13:
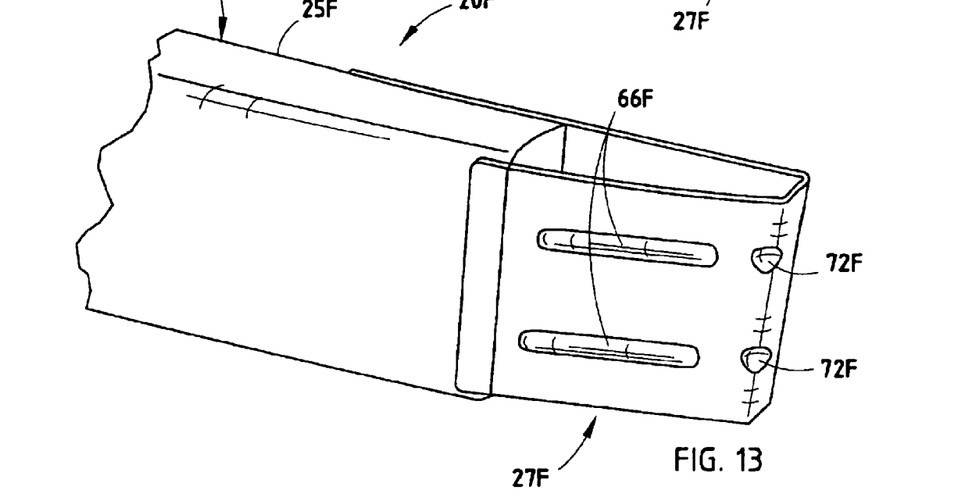
FIGS. 13–14 are enlarged top perspective and top views of an end of FIG. 12.
Figure 14:
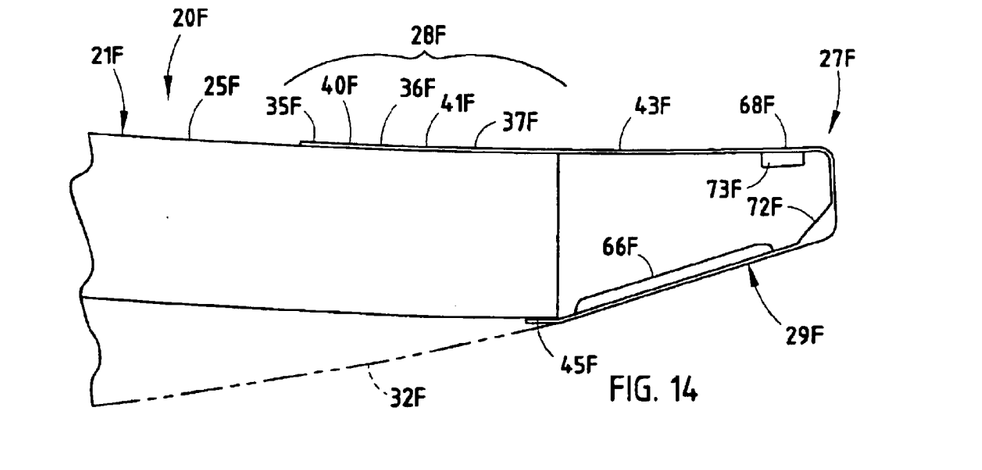
Figure 15:
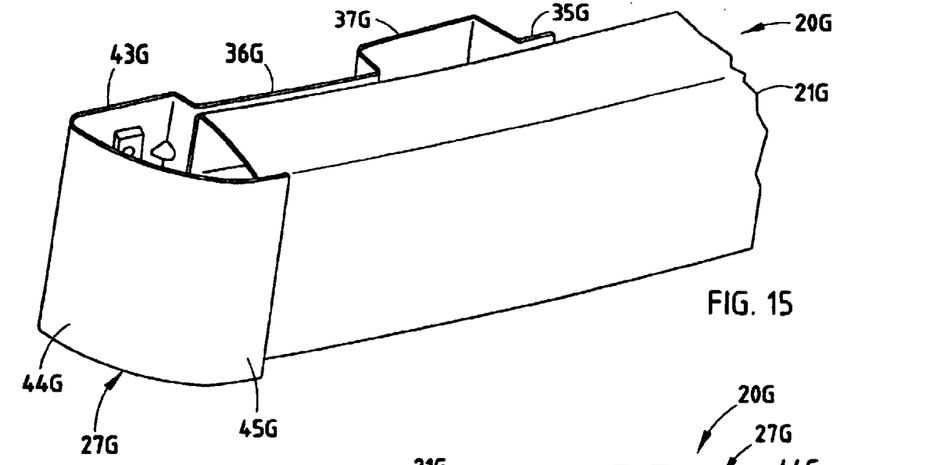
FIG. 15 is an enlarged perspective fragmentary view of a seventh bumper system.
Figure 16:
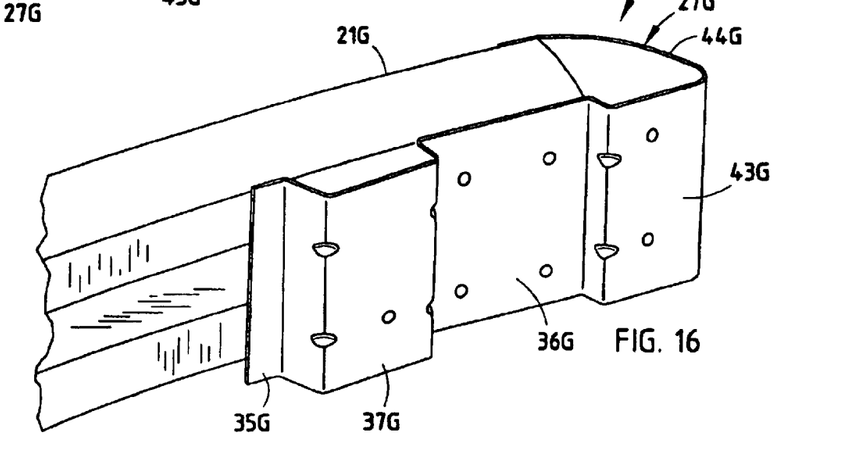
FIGS. 16–17 are a rear perspective and a top view of FIG. 15.
Figure 17:
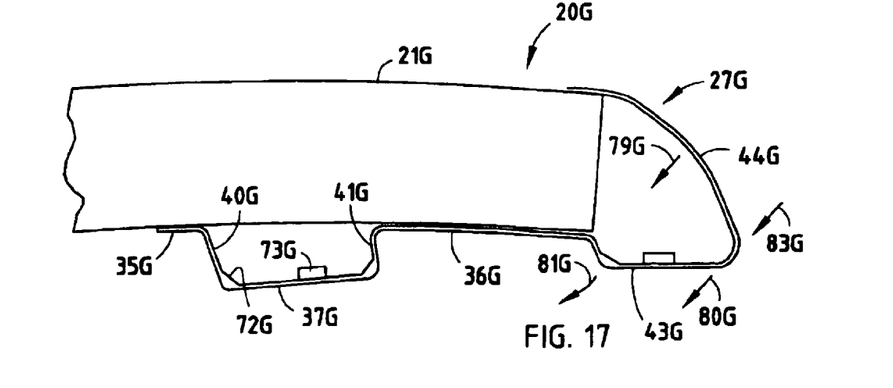

Legs 40 and 41 interconnect at the flanges 35 and 36 with the rail rear attachment flange 37. The corner-forming section 29 has a leg 42 and a second rear attachment flange 43 that attaches to the plate 38. The intermediate portion 44 extends from the flange 43 outwardly in an outboard direction and forwardly, and terminates in an attachment flange 45 that is attached to a front surface of the front wall 22 of beam 21. It is noted that the attachment flange 45 can attach to a rear surface of the front wall 22, if desired, or it can be positioned in a recess in the front surface of the front wall 22 if a flush mounted condition is desired. It is noted that the illustrated portion 44 is spaced from the open end 26 of the beam 21 and is curvilinearly shaped to provide room for the intermediate portion 44 to flex, deform, and bend and absorb energy during a corner impact.

In the illustrated arrangement of FIG. 1, the energy absorber 32 includes an elongated center section 52 supported on a front surface of the front wall 22, and further includes relatively short end sections 50 supported on an outer/front surface of the intermediate section 44 of the brackets 27. It is noted that the end section 50 of the energy absorber 32 wraps around and extends rearwardly to form a compound angle with front surface of the energy absorber, so as to give an aerodynamic look to a corner of the vehicle. As illustrated in FIG. 2, this allows an end of the beam 21 to be cut short to eliminate material (as illustrated by the dashed lines 51). Thus, the present arrangement saves material as well as provides an integrated mounting solution for the end of the beam 21. This arrangement also eliminates the need to provide an angled or complex non-perpendicular cut at an end of the bumper beam 21, which would be needed if angled section 29 were not present.

Modified bumper systems 20A–20G are shown in FIGS. 3–17. In these modified bumper systems, identical or similar components to those of bumper system 20 are identified with identical numbers, but with the addition of a letter "A", "B", "C", etc. This is done to reduce redundant discussion and redundant explanations. It is noted that each of the bumper systems 20–20G preferably include a long swept beam that extends a full width of a vehicle, and include a pair of mounting brackets and/or a polymeric molded energy absorber, even though these items are not all shown in each embodiment.

The bumper system 20A (FIG. 3) includes a beam 21A, a mounting bracket 27A, and an energy absorber 32A. On the outboard side of the mounting bracket 27A, the intermediate portion 44A extends significantly outboard from the open end 26A to form a more bulbous shape than the corresponding portion 44 in the bumper system 20. The intermediate portion 44A in bumper system 20A is further formed to have a forward half 53A with a front surface that generally is flush with and aligns with the front surface 32A' of the energy absorber 32A.

It is noted that the illustrated surface of half 53A angles rearwardly from the front surface 32A' to form a more aerodynamically-shaped rearwardly-swept corner of the vehicle. Also, the end section (see end section 50 in FIG. 1) of the energy absorber 32A is eliminated in FIG. 3. This saves material, saves weight, and conserves space as well as integrating features into the bumper system design arrangement.

The bumper system 20B (FIG. 4) includes a mounting bracket 27B having another modified intermediate portion 44B. The intermediate portion 44B is modified to include one or more crush initiators 55B in the form of a back and forth bend 56B in the forward half 53B. By this arrangement, the energy transfer and energy absorption characteristics during corner impact are changed considerably, since the crush initiator bend 56B causes a much less sharp initial increase in resistance. Instead, the bend 56B causes a more evenly distributed initial energy absorption and earlier permanent deformation of the intermediate portion 44B.

In the bumper system 20C (FIG. 5), the corner-forming section 29C includes a forward protrusion 60C that fits within an aperture 61C in the rear wall 25C of the beam 21C near an outer end of the beam 21C. By this arrangement, when the mounting bracket 27C receives a corner impact, the forces are transferred more quickly and to a larger extent through protrusion 60C directly into and along the beam 21C, such that the mounting brackets 27C on both sides absorb considerable force from the corner impact, even though the impact is on a single side of the vehicle. By this method, the corner impact forces are more immediately and uniformly transferred to both sides of the vehicle through the two opposing mounting brackets 27C and the beam 21C.

Bumper system 20D (FIGS. 6–8) includes a B-shaped beam 21D and mounting bracket 27D. The B-shaped beam 21D is longitudinally curved (commonly referred to in the art as being "swept"). The B-shaped beam 21D has its flat front wall 22D facing forwardly, such that the top and bottom two tubular lobes of beam 21D form a channel 65D in a rear side of the beam 21D. A polymeric energy absorber (not specifically shown in FIG. 6) is positioned against the front surface of the flat wall 22D of the beam 21D. The mounting bracket 27D is not unlike the mounting bracket 27 of FIG. 1. However, the mounting bracket 27D (FIG. 7) is somewhat shallower in depth. Further, the intermediate portion 44D is planar, and includes fore/aft extending channel embossments or ribs 66D that stiffen the intermediate portion 44D, reducing its resiliency. Also, the plate 38D includes curled edge flanges 67D that stiffen the plate 38D. The channel 65D divides the rear wall 25D of beam 21D into upper and lower portions. The attachment flanges 35D and 36D are attached by welding to both of the upper and lower portions of the rear wall 25D. A plurality of mounting holes 68D are formed in the plate 38D to assist in the attachment to the vehicle frame structure 39D, and weld nuts 73D are positioned at each hole 68D.

The B beam 21D (FIG. 8) has an enlarged irregular aperture 69D that extends from the front wall 22D onto the bottom wall 24D. The illustrated aperture 69D is located at an inboard edge of the mounting bracket 27D, with an inboard end of the aperture 69D being at a location approximately equal to the inboard attachment flange 35D, and with its outboard end being at a location approximately equal to an inner edge of the outboard attachment flange 36D. The aperture 69D has curvilinear sides that extend up to about 20% into front and bottom walls 22D and 25D. The aperture 69D is configured to be a crush initiator, which serves to strategically weaken the beam 21D, thus promoting a more uniform, consistent and predictable collapse and energy absorption upon corner impact. Also, an end of the front and bottom walls 22D and 25D of beam 21D has an irregular cutout 74G that also advantageously affects corner impact characteristics.

The bumper system 20E (FIGS. 9–11) includes a B beam 21E and a mounting bracket 27E not unlike the beam 21D and mounting bracket 27D. However, the mounting bracket 27E includes a modified intermediate portion 44E that comprises two angled planar sections 44E' and 44E'. The planar sections 44E' and 44E" form a concave shape that are spaced from the open ends of beam 21E but that covers the open tubular end of the beam 21E. The mounting section 28E also includes a rearwardly-formed horizontal rib 70E formed in the members 36E, 41E, and 42E. A bottom 70E' of the rib 70E extends coplanar with the attachment flanges 37E and 43E. Slots 71E are formed in the top and bottom portions of attachment flange 36E, such as to facilitate welding the attachment flanges 36E to the rear wall 25E of the beam 21E. Gusset embossments 72E are formed at corner bends in the mounting section 28E to strengthen and stabilize the bracket 27E. Weld nuts 73E are attached under the mounting holes 68E for screw attachment to the vehicle rail and plate 39E and 38E, respectively.

The bumper system 20F (FIGS. 12–14) includes a beam 21F and a pair of mounting brackets 27F. However, the mounting section 28F of the mounting bracket 27F is relatively flat and is shaped to engage the rear wall 25F, with the members 35F, 36F, 37F, 40F, and 41F all being coplanar. Attachment holes 68F are located in the leg 43F and/or are located in one of the members 35F–37F/40F–41F. Where needed, a corresponding hole is formed in the rear wall 25F of the beam 21F. Gusset embossments 72F and channel embossments 66F stiffen the bracket 27F. Weld nuts 73F are attached at holes 68F, if needed. An energy absorber, illustrated by dashed lines 32F, is shown with a front surface that generally aligns with and terminates short of the front surface of the corner-forming section 29F of the bracket 27F. Alternatively, it is contemplated that the energy absorber could include an end section that extends onto and is supported by the corner-forming portion 29F.

Bumper system 20G (FIGS. 15–17) includes a beam 21G and a pair of mounting brackets 27G. The mounting bracket 27G is not unlike the mounting bracket 27A (FIG. 3), except that the outboard attachment flange 43G (FIG. 17) is elongated and positioned off an end of the beam 21G, and the intermediate section 44G is made bulbous and curvilinear such that it forms a triangular-like shape off the end of the beam 21G. As a result, the intermediate section 44G exhibits resilient elastic flexure in direction 79G (FIG. 17) prior to permanent deformation upon receiving a corner impact during a vehicle crash. Also, the entire concave structure formed by the intermediate section 44G and outboard attachment flange 43G may tend to undergo a parallelogram-type collapse in directions 80G–81G if the outermost corner is impacted from an impacting force in direction 83G.

It is noted that the ornamental appearance and aesthetic design of the bumper systems 20–20G and of the mounting brackets 27–27G are also believed to be inventive, novel, ornamental, unobvious and hence, patentable.

In the foregoing description, it will be readily appreciated by those skilled in the art that modifications may be made to the present inventive concepts without departing from the concepts disclosed herein. Such modifications are to be considered as included in the following claims, unless these claims by their language expressly state otherwise.

We claim:

1. A bumper system for vehicles comprising:
   a tubular beam having front, top, bottom, and rear walls defining at least one tube; and
   a pair of mounting brackets attached to the beam near associated ends of the beam, the mounting brackets each having an inboard edge and the tubular beam having an end section that begins at a location near the inboard edge and that extends to the associated end of the beam;
   at least one of the front, top, bottom, and rear walls having an aperture forming a crush initiator on the end section, the crush initiator being shaped to selectively reduce a strength of the beam in an area of the crush initiator for controlling corner impact strength, wherein the aperture is formed in a corner formed by two adjacent ones of the walls.

2. The bumper system defined in claim 1, wherein the tubular beam is made from a continuous sheet of material roll formed to have a cross-sectional shaped of the tubular beam.

3. The bumper system defined in claim 2, wherein the aperture is irregularly shaped and includes non-parallel sides.

4. The bumper system defined in claim 1, wherein the aperture is located at least in part at an inboard edge of the associated mounting bracket.

5. The bumper system defined in claim 1, wherein the aperture extends laterally on the beam to about 20% of at least one of the two adjacent walls.

6. A bumper system for vehicles comprising:
   a tubular beam having front, top, bottom, and rear walls defining at least one tube; and
   a pair of mounting brackets attached to the beam near associated ends of the beam, the mounting brackets each having an inboard edge and the tubular beam having an end section that begins at a location near the inboard edge and that extends to the associated end of the beam;
   at least one of the front, top, bottom, and rear walls having an aperture forming a crush initiator on the end section, the crush initiator being shaped to selectively reduce a strength of the beam in an area of the crush initiator for controlling corner impact strength, wherein the aperture is formed at a rear edge of at least one of the top and bottom walls, the rear edge forming part of the aperture.

7. A bumper system for vehicles comprising:
   a tubular beam having front, top, bottom, and rear walls defining at least one tube; and
   a pair of mounting brackets attached to the beam near associated ends of the beam, the mounting brackets each having an inboard edge and the tubular beam having an end section that begins at a location near the inboard edge and that extends to the associated end of the beam;
   at least one of the front, top, bottom, and rear walls having an aperture forming a crush initiator on the end section, the crush initiator being shaped to selectively reduce a strength of the beam in an area of the crush initiator for controlling corner impact strength, wherein the aperture is formed at or outboard of the inboard edge of the mounting bracket.

8. The bumper system defined in claim 7, wherein the aperture is located at least in part at an inboard edge of the associated mounting bracket.

9. The bumper system defined in claim 7, wherein the aperture extends laterally on the beam to about 20% of at least one of the two adjacent walls.

10. A bumper system for vehicles comprising:
   a tubular beam having front, top, bottom, and rear walls defining at least one tube; and
   a pair of mounting brackets attached to the beam near associated ends of the beam, the mounting brackets each having an inboard edge and the tubular beam having an end section that begins at a location near the inboard edge and that extends to the associated end of the beam;

at least one of the front, top, bottom, and rear walls having an aperture forming a crush initiator on the end section, the crush initiator being shaped to selectively reduce a strength of the beam in an area of the crush initiator for controlling corner impact strength, wherein the aperture is formed at a corner formed by the front and bottom walls.

11. A bumper system for vehicles comprising:

a tubular beam having front, top, bottom, and rear walls defining at least one tube; and a pair of mounting brackets attached to the beam near associated ends of the beam, the mounting brackets each having an inboard edge and the tubular beam having an end section that begins at a location near the inboard edge and that extends to the associated end of the beam;

at least one of the front, top, bottom, and rear walls having an aperture forming a crush initiator on the end section, the crush initiator being shaped to selectively reduce a strength of the beam in an area of the crush initiator for controlling corner impact strength, wherein the aperture is non-symmetrically and irregularly shaped and includes non-parallel sides.

12. The bumper system defined in claim 11, wherein the aperture sides are curvilinearly shaped.

13. The bumper system defined in claim 11, wherein the aperture is located at least in part at an inboard edge of the associated mounting bracket.

14. The bumper system defined in claim 11, wherein the aperture extends laterally on the beam to about 20% of at least one of the two adjacent walls.

15. A bumper system for vehicles comprising:

a tubular beam having front, top, bottom, and rear walls defining at least one tube; and a pair of mounting brackets attached to the beam near associated ends of the beam, the mounting brackets each having an inboard edge and the tubular beam having an end section that begins at a location near the inboard edge and that extends to the associated end of the beam;

at least one of the front, top, bottom, and rear walls having an aperture forming a crush initiator on the end section, the crush initiator being shaped to selectively reduce a strength of the beam in an area of the crush initiator for controlling corner impact strength;

wherein the aperture is irregularly shaped and includes non-parallel sides that are curvilinearly shaped; and wherein the aperture causes the associated end section to collapse angularly and rearwardly as a unit upon undergoing a corner impact.

16. The bumper system defined in claim 15, wherein the aperture is located at least in part at an inboard edge of the associated mounting bracket.

17. The bumper system defined in claim 15, wherein the aperture extends laterally on the beam to about 20% of at least one of the two adjacent walls.

18. A method comprising steps of:

providing a tubular beam having front, top, bottom, and rear walls defining at least one tube section;

attaching mounting brackets to the beam, the beam including end sections that extend in an outboard direction from an inboard edge of the mounting brackets; and forming crush initiating apertures in the end sections so as to weaken the ends sections for providing a desired corner impact energy absorption.

19. The method defined in claim 18, wherein the step of providing the tubular beam includes roll forming a sheet of material to form a cross section of the tubular beam.

20. The method defined in claim 18, wherein the step of forming the apertures includes forming the apertures to extend laterally on the beam to about 20% of a wall on the end sections.

21. A bumper system for vehicles comprising:

a tubular beam having front, top, bottom, and rear walls defining at least one tube; and a pair of mounting brackets attached to the beam near associated ends of the beam, the mounting brackets each having an inboard edge and the tubular beam having an end section that begins at a location near the inboard edge and that extends to the associated end of the beam;

at least one of the front, top, bottom, and rear walls having an aperture forming a crush initiator on the end section, the crush initiator being shaped to selectively reduce a strength of the beam in an area of the crush initiator for controlling corner impact strength, wherein the aperture causes the associated end section to collapse angularly and rearwardly as a unit upon undergoing a corner impact.

* * * * *